United States Patent [19]

Scheib

[11] 4,023,903
[45] May 17, 1977

[54] LIGHT COMPOSER FOR PROVIDING EVEN FIELD ILLUMINATION AND DIFFUSE LIGHT

[75] Inventor: Harold A. Scheib, Encino, Calif.

[73] Assignee: Bell & Howell Company, Chicago, Ill.

[22] Filed: Aug. 11, 1975

[21] Appl. No.: 603,492

[52] U.S. Cl. .............................. 355/71; 240/1 LP; 355/67
[51] Int. Cl.[2] ........................................ G03B 27/76
[58] Field of Search .................. 355/67, 68, 69, 70, 355/71, 14; 240/1 LP, 2.1, 41 R; 350/96 R, 96 T

[56] References Cited

UNITED STATES PATENTS

| 1,880,414 | 10/1932 | Capstaff | 350/96 R |
|---|---|---|---|
| 2,424,064 | 7/1947 | Stegeman | 350/96 R |
| 3,437,804 | 4/1969 | Schaefer et al. | 350/96 R |
| 3,497,981 | 3/1970 | Tyne | 240/1 LP |

Primary Examiner—Russell E. Adams
Attorney, Agent, or Firm—Luc P. Benoit

[57] ABSTRACT

An improved light composer for use in duplicating film which illuminates each frame of film with an even and thoroughly diffused source of light delivered over a distance in order to prevent the replication of scratches and other surface imperfections in the master copy. The improved light diffuser comprises a light mixer with two opposed ends. The surface of the mixer is optically rough but reflective. A means for scattering light typically covers one of the ends of the mixer. Such means may be a plurality of clear lenses, each having a focal length substantially less than the length of the mixer. In such a case, light is refracted by a plurality of lenses and propagates along the length of the mixer by means of a multiplicity of reflections, whereby a plane opposed to the plurality of lenses is illuminated by a thoroughly diffused and even source of light. One or more scattering means may be combined into a plurality of stages with shutters to produce fades and dissolves on the duplicate copy of film.

27 Claims, 11 Drawing Figures

LIGHT COMPOSER FOR PROVIDING EVEN FIELD ILLUMINATION AND DIFFUSE LIGHT

BACKGROUND OF THE INVENTION

1. Field of the Invention

The present invention relates to the field of photographic equipment used to produce a strong, even, diffused source of light. More particularly, the present invention relates to photographic equipment used to duplicate film wherein the master copy, which is being duplicated, is illuminated by a diffused source of light.

2. Description of the Prior Art

The abrasion or other scratching or master film copies presents a particularly acute problem in the film printing. In order to produce the highest possible illumination at the aperture of the printer head, most printers incorporate a specular or collimated illumination and imaging system which is produced by a system of mirrors and condenser lenses to collect and guide the light from a bright lamp to a projector film gate. The light so produced is characterized by substantially parallel rays which tend to accentuate scratches in the master copy. Most shallow scratches occur on the film support base, but whether on the base or in the emulsion, the effect of the scratch is to scatter collimated light which passes through the film. The scratches and other surface imperfections in the master copy scatter the light and thereby cause a shadow or line to be visible in the projected image. It may be appreciated that the higher the degree of collimation, (which is characteristic of most high intensity light sources) the greater is the accentuation of the surface imperfections of the projected image.

Three techniques are currently employed for the removal of both emulsion and film base scratches. Scratches may be partially or completely removed through "liquid-gate" optical printing. The process requires that the scratched master copy be momentarily immersed or covered with a transparent fluid during the period when it passes into contact with a duplicating stock or through the intermittent of the optical printer's projector. A fluid is employed which has substantially the same refractive index as the film base or the emulsion. The fluid fills in the scratched valleys and allows the light from the lamp house and condensers to pass straight through the film without being displaced through the scratches. The use of a "liquid-gate" is generally an expensive and complex process. Such a process requires the use of very elaborate machinery which includes pumps, filters, bubble traps, heaters, a vacuum system and electronic controls.

The second technique simply involves enlarging those portions of the master copy which are unscratched. The usefulness of this technique is limited to those instances in which the surface imperfection is systematically confined to an edge portion of the master copy so that the selective enlargement of the master copy is not so great as to sacrifice large amounts of visual information, to unbalance the composition of the original scent, or to increase the grain size of the image.

The third technique to minimize scratches involves the use of a diffused light source to illuminate the master copy. If the illuminating light is thoroughly diffused, the perturbations caused by scratches in the master copy will not create a visual perturbation in the projected image, since the diffuse light incident on the film will have substantially the same degree of diffuseness after transmission through the film. The drawback of prior art optical printers, using a diffused light system, is that such diffusers lowered the illumination level considerably. Moreover, none of these diffusers are able to deliver a strong, even source of diffuse light at any significant distance from the diffuser. The lower illumination level requires that the optical printer operate at a slower and less economical printer speed. With the prior art diffusers it is not uncommon that the printer speed will be eight times slower (illumination level will be three stops lower) than speeds obtainable with the liquid gate process.

However, where a diffuse light has been previously used, a polished or abraded flat glass plate or opal glass plate is typically placed immediately behind the film gate so that substantially all the light transmitted through the plate is incident upon the film gate. However, as the distance between the diffusing plate and the film gate increases, the light intensity decreases inversely as the square of the distance and the measure of diffusion of the light likewise dramatically decreases. Therefore, in the prior art, it is only possible to use diffusing plates when positioned close to the film. This has the disadvantage that the diffusing plate, typically ground or opal glass, has a certain grain or texture defined by its mode of manufacture, which tends to be imposed upon the projected image. Moreover, it is the observed fact that when the diffusing optics is positioned substantially adjacent to the film gate, there is a tendency for grease, oil, and dirt to accumulate on the diffusing optics. Also, since the diffusing opal glass is adjacent to the film plane, it is imperative that the light is evenly distributed before it strikes the diffusing glass.

Therefore, what is needed is a simple, inexpensive means for illuminating a master copy of film in such a manner that the existence of scratches and other surface imperfections may be de-emphasized. In addition such illumination must be accomplished without incurring the disadvantages of loss of light intensity, short range of illumination, uneven illumination field, low measure of diffuseness, or tendency to foul which characterizes prior art diffusion systems or the disadvantages of undue complex and expense which characterizes "liquid-gate" systems.

BRIEF SUMMARY OF THE INVENTION

The present invention is a light composer used in an appratus for duplicating photosensitive film. In one embodiment the light composer comprises a light mixer which has an optically rough but reflective surface of which at least a portion is arranged and configured to scatter the incident light toward the remaining portion of the surface of the mixer. In another embodiment the light composer comprises a light mixer having a reflective surface and two opposed ends and includes a separate means for scattering light fixed to one of the ends of the mixer. This scattering means is functionally equivalent to the scattering portion of the surface in the former embodiment. The means scatters incident light and transmits the scattered light toward the inner surface of the mixer. Light incident upon the inner surface of the mixer undergoes multiple reflections and propagates down the length of the mixer to the end opposed to the scattering means. The light composer present a thoroughly diffused, high intensity and uniform source of light across a plane parallel to the end of the mixer which is opposed to the means for scattering light. A plurality of scattering means may be arranged within the mixer in combination with one or more shutters to provide a mechanical means for modulating the light intensity transmitted through the composer.

More particularly, the light composer may be a hollow or solid light conducting housing having opposed ends. The length the housing is substantially greater than any cross sectional dimension. The interior surface of the housing has a optically roughened and reflective surface. In one embodiment the housing may be curved so that incident light principally strikes one portion of its surface. Such surface may be specially treated to scatter the incident light to the remainder of the surface of the housing. In another embodiment an optically clear plate is disposed across one of the ends and has an interior surface configured and arranged into a plurality of lenses or other means for scattering light. Each of the lenses on the surface has a focal length substantially less than the length of the housing. The plurality of lenses are arranged and configured to direct a multiplicity of light rays towards the interior surface of the housing so that a multiplicity of reflections occur within the housing and a thoroughly diffused, high intensity and uniform light is transmitted across a distance to the end of the housing which is opposed to the plurality of lenses.

DETAILED DESCRIPTION OF THE EMBODIMENTS

The present invention is an improved light composer for use in printers or other apparatus used to duplicate photosensitive film. The light composer is comprised of a light conduction element, or a light mixer having an optically rough and reflective interior surface combined with a means for scattering light disposed near or adjacent to one of the ends of the mixer. Typically, a high intensity collimated light source illuminates a scattering means or surface which then scatters the light into a multiplicity of divergent rays. The rays undergo multiple reflections between the interior walls of the light mixer and are eventually transmitted to the end opposed to the scattering means or surface. At this point, the number of reflections within the housing is so great that a random or thoroughly diffused source of light is presented across a plane parallel to the end of the mixer which is opposed to the scattering means or surface. The present invention and its uses may be better understood by referring to the figures.

Figure 1:
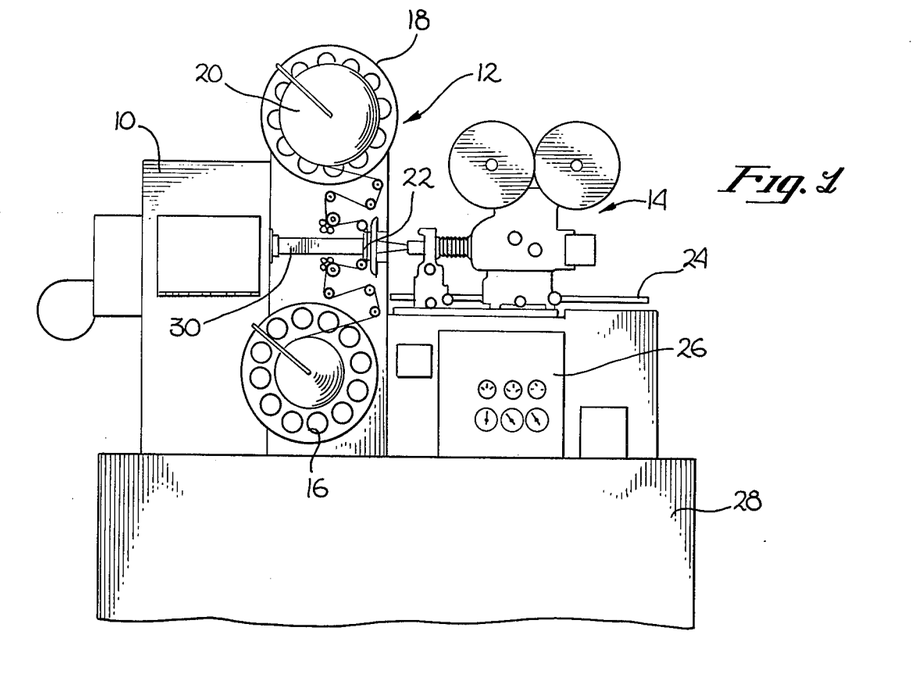
FIG. 1 is a simplified side view of an optical printer incorporating the light composer of the present invention.

One of the uses for which the present invention is ideally suited is an optical printer or other apparatus used for duplicating photosensitive film. Although it is in no way so strictly limited and may be used wherever strong, uniform diffuse light must be delivered over a distance, such as in still enlargers and contact printers. A side view of an optical printer is illustrated in FIG. 1. The main elements of an optical printer are a lamphouse 10, a projector 12, and a camera 14. For example, the lamphouse in the Model 2103C printer, manufactured by Research Products, Inc., 6868 Lexington Ave., Hollywood, Calif., is designed to operate with continuously moving and exposed printing stock rather than simultaneously exposing an entire frame for a fixed time interval. The field of illumination of this lamphouse, although being color corrected, contains both intensity and color fringes which makes it unsuitable for the intermittent, frame-by-frame exposure process. The present invention, as described below, allows optical printers, like Model 2103C, to utilize this type of lamphouse in a frame-by-frame exposure process. The printer incorporates a tape-programmed additive lamphouse 10 which generates a color controlled, collimated light beam in order to compensate for scene-to-scene color corrections, density changes, and fades or dissolves. Projector 12 is essentially comprised of a take-up and feed reel 16 and 18. Various sprocket drives and idler wheels also form part of projector 12, their organization being well known to the art. A master copy 20 of the film to be duplicated is driven by projector 12 through a film gate 22. Camera 14 is slideably mounted on an optical bench 24 and is focused by conventional means on the emulsion layer of film retained in film gate 22. A control panel 26 is provided to allow manual operation or initiation of the pre-programmed operation of the optical printer. The entire optical printer is mounted on a rigid base 28 which provides additional storage area for electronic controls and a means for leveling the printer. Projector 12 and camera 14 both incorporate electronically controlled stepping motors, the operation of which is described in detail in Butler, et al., U.S. Pat. No. 3,637,299.

Light generated by lamphouse 10 is focused on one end of composer 30. Color corrected light propagating through composer 30 is thoroughly diffused and projected upon film gate 22 whereby an image is transmitted and recorded by camera 14.

Figure 2:
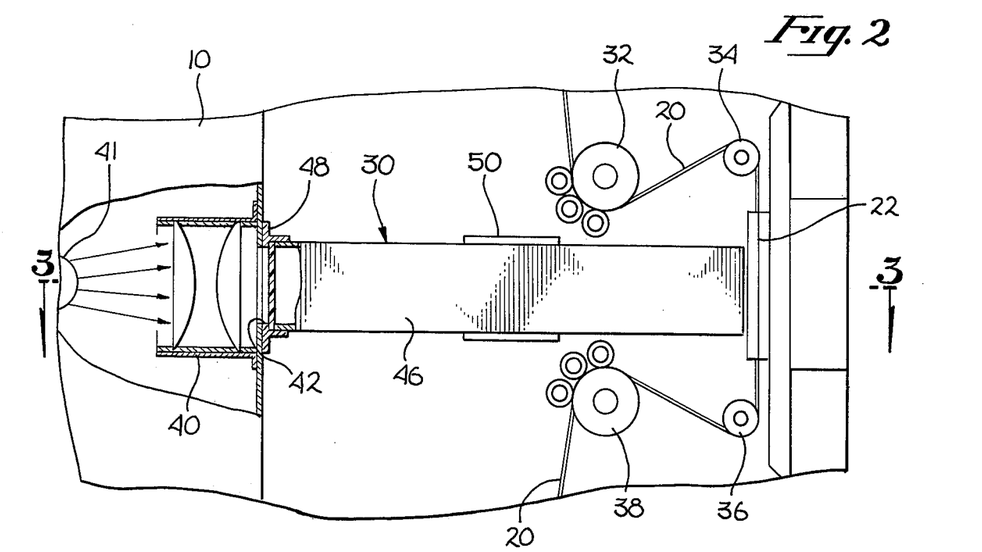
FIG. 2 is an enlargement of the light composer of the present invention shown in relationship to the light source and film gate of the optical printer shown in FIG. 1.

The details of composer 30 and its operation may be better understood by viewing FIG. 2. Film 20 is fed through a sprocket drive 32 and over an idler wheel 34 through film gate 22. Film 20 is then taken up across an idler wheel 36 and a second sprocket drive 38. Light from lamphouse 10 is collected by an optical system 40 which focuses the light into a collimated beam which exits lamphouse 10 through a port 42. Optical system 40 is illustrated in FIG. 2 as a simple two-lens system, but in practice may be any optical system including one or more lenses, reflectors, shutters, or baffles, which are well known to the prior art to produce a color correct, or collimated beam. The use of an optical system is illustrated only by way of example and any other means of directing light well known to the art may be used. It is also possible that no additional means for directing light will be used between light source 41 and composer 30. The beam of light is incident upon a means 44, which is used in the present invention to scatter the light within a mixer 46. Means 44 is fixed to housing 46 by a retaining ring 48. Retaining ring 48 is also fixed to lamphouse 10. Mixer 46 is supported approximately at its midpoint by a support bracket 50. Thus, composer 30 is rigidly fixed to the optical printer and positioned between lamphouse 10 and film gate 22 by means of bracket 50 and retaining ring 48.

Figure 3:
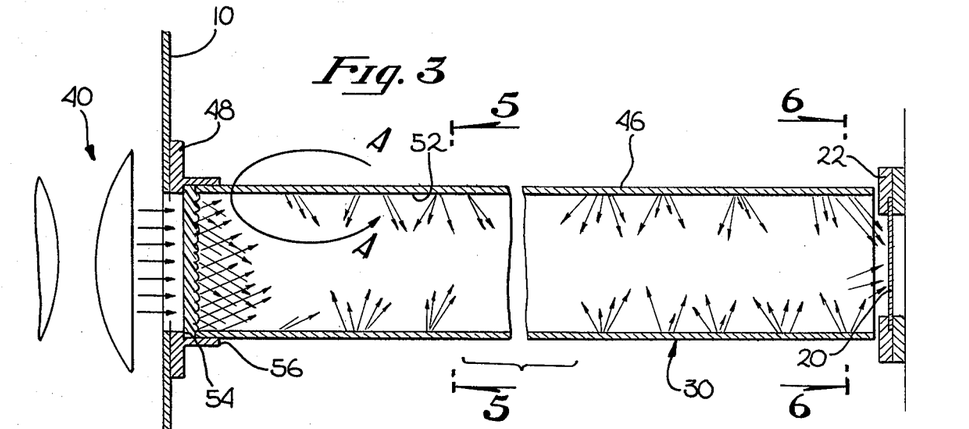
FIG. 3 is a cross section of the light composer showing its relationship to a collimated light source and a film gate.

The details of the structure and the operation of light composer 30 is more clearly illustrated in FIG. 3 which shows a cross section taken along the longitudinal axis of mixer 46. In the embodiment illustrated, mixer 46 is shown as a hollow prismatic housing having a square cross section. However, the mixer may have any geometric cross cross section and need not be prismatic or hollow, but may assume the shape of a truncated cone or a curved solid light pipe of glass, plastic or similar material. At one end is means 44 which is used to scatter or refract light incident upon light composer 30 from optical system 40. In particular, mixer 46 is a section of square, hollow, extruded aluminum stock which is widely available from metal fabricators. The square aluminum stock is cut to a suitable length, which is typically between 12 to 14 inches. The ends of the stock are faced off to be smooth and perpendicular. The section is then de-greased using de-greasing agents well known to the art. At this point the interior surface of mixer 46 is provided with an optically roughened and reflective coating or surface 52. Although many materials may be used to provide an optically rough and reflective surface or coating, a layer of aluminum spray paint, such as it is widely sold in aerosol cans, provides an adequate surface. Although the spray painted surface is adequate for most applications, it is possible to improve surface control by treating the exterior surface of a solid or hollow, transparent light pipe, e.g., roughening and silvering the outside of a hollow plastic or glass tube. Since no precaution is taken to provide a polished interior surface for mixer 46, and since no special manner of application is taken in spraying the aluminum paint on the interior surface of mixer 46, the resulting layer of paint has an optically rough surface. Light incident upon the surface or layer 52 is diffusely reflected due to the irregularity of its surface, which is shown in greatly exaggerated form in FIG. 4.

Figures 4, 5, 6, 7:
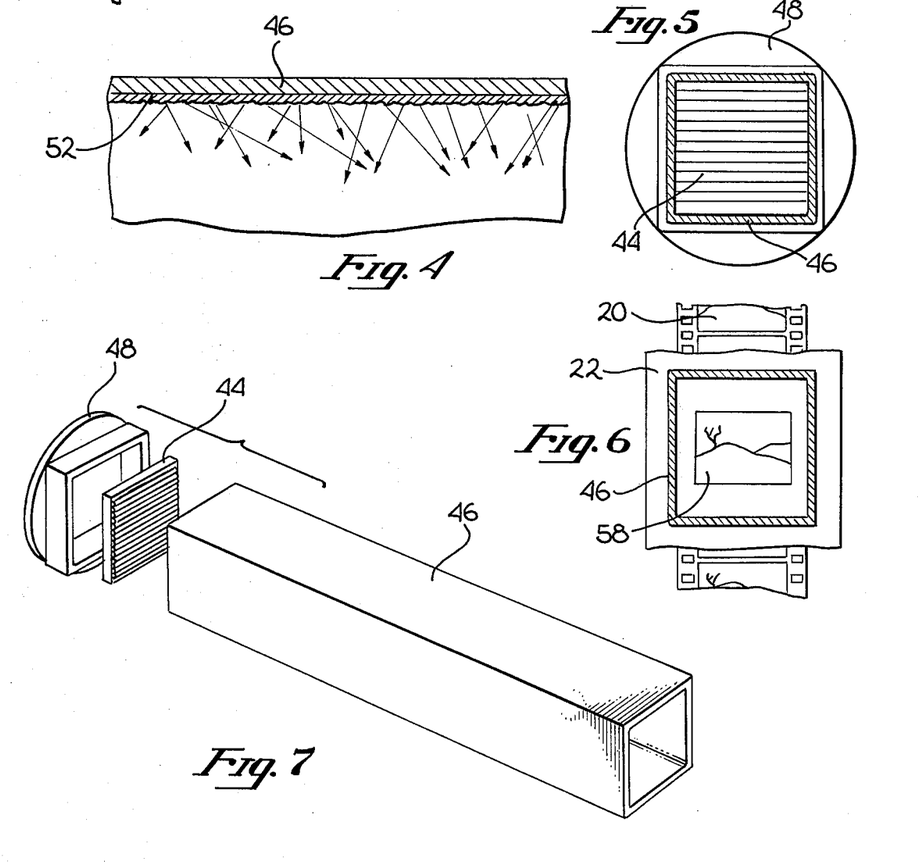
FIG. 4 is an enlargement of the sectional view of the interior wall of the light mixer taken through line 4 — 4 of FIG. 3.
FIG. 5 is a plan view of a light composer taken through section 5 — 5 of FIG. 3 showing one embodiment of the means for scattering light and one embodiment for the light compser's cross-section.
FIG. 6 is a plan view taken through section 6 — 6 along the axis of the mixer showing one embodiment of the mixer's cross-section in its relation to the adjacent film and film gate.
FIG. 7 is an exploded prospective view of one embodiment of the light composer showing each of its elements.

Means 44 is disposed across one end of mixer 46 by a retaining ring 48 which is illustrated in cross section FIG. 3 and in plan view in FIG. 5. Retaining ring 48 has an interior shoulder 54 against which means 44 is disposed. Mixer 46 is coupled to retaining ring 48 by a collar 56 which encloses both means 44 and one end of mixer 46. The mode of coupling mixer 46 to means 44 is shown in exploded view of FIG. 7, although any other mode known to the art may be employed. Means 44 may be an optically clear layer of material which has one surface configured to scatter or multiply refract light. Typically, means 44 is a clear plastic layer having one surface formed into a plurality of lenses shaped in the form of a half cylinder and extending across in a mutually parallel fashion across the clear plastic layer (best illustrated in FIGS. 5 and 7). The fineness of the grating formed by the lenses is determined by the degree of collimation of the incident light provided by the condenser optics, the character of the reflective surface of mixer 46, and the length of mixer 46. Scattering means 44 may include any means for bending or directing the light to the walls of mixer 46. This would include any combination of lenses, prisms, and mirrors including a simple bend or curve in mixer 46 whereby the propagation of light is unchanged but the walls of mixer 46 are curved so as to intercept the incident light (described in greater detail in connection with FIG. 10). In the embodiment illustrated each of the lenses formed on the interior surface of means 44 has a focal length which is substantially less than the length of mixer 46. Thus, collimated light generated by lamphouse 10 and incident upon means 44 is multiply refracted and directed towards the interior surfaces of mixer 46 at a point substantially near means 44. It is to be emphasized, however, that collimated incident light is not necessary for the operation of the present invention which operates on any type of light source. The multiply refracted light rays are then transmitted along the length of mixer 44 by means of a multiplicity of randomly oriented reflections. By the time the light rays have propogated down the length of mixer 46, the light forms a thoroughly diffused and uniform illumination across the open end of mixer 46 which is opposed to means 44. Film gate 22 is positioned adjacent to the end of mixer 46 which is opposed to means 44.

Figure 9A:
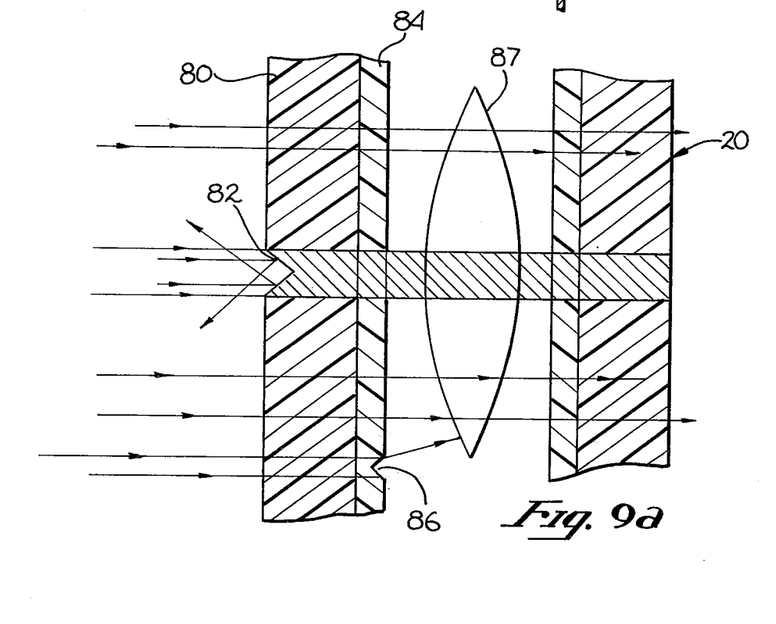
FIG. 9a and 9b are simplified, enlarged cross sections of a film base and emulsion illustrating the physical principles of operation of diffuse light on defective film as compared to that of collimated light.

FIGS. 9a and 9b graphically illustrate the physical principles of operation of the present invention. FIG. 9a shows a film base 80 having a surface imperfection or scratch 82. An emulsion layer 84 is disposed on film base 80 and has a surface imperfection or scratch 86. The film illustrated in FIG. 9a is illuminated with collimated light and focused by means of a lens system 87 on a film copy. Although it is not perfectly understood, scratch 86 in emulsion 84 and scratch 82 in base 80 both cause incident light to be scattered thereby creating a shadow which originates at the scratch. The sharpness of the shadow will be determined by the degree of collimation of the incident light and the surface details of the scratch or imperfection. It has been observed that the largest scratches, both in number and size, are found in base 80 rather than emulsion 86, since the emulsion is several times harder than base 80. Moreover, the scratches which do occur in emulsion 86 are less emphasized since they lie in the focal plane of lens 87 and thus, light scattered from emulsion scratched are focused on the film copy, while scratches in base 80 tend to create a shadow region in the emulsion of the master copy which are then printed as shadows on the film copy.

Figure 9B:
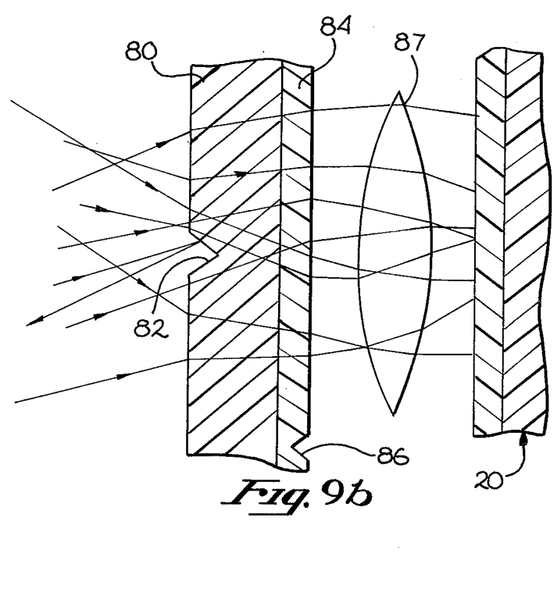

FIG. 9b illustrates film base 80 and emulsion 84 having scratches or surface imperfections 82 and 86, respectively, wherein the film is illuminated by diffuse light. When illuminated by diffused light it can be seen that each ray undergoes scattering as it transverses a boundary of optical discontinuity. Thus, the light within base 80 and emulsion 84 remains randomly diffused and the perturbation added by scratches 82 and 86 only further diffuse a certain portion of the light ray. The degree of diffuseness of the light emerging from emulsion 84 is substantially the same as the degree of diffuseness of the light incident upon base 80. Thus, substantially no shadow is projected onto film copy 20.

Thus, it may be appreciated that the high intensity light, even from a very nonuniform field, when directed by optical system 40 and through port 42 onto means 44, is transformed into a uniform and thoroughly diffused illumination at the opposed end of mixer 46. The use of diffuse light in duplicating color film has the added advantage of softening contrasts which tend to be built up during the copying and developing processes. The only alternative to diffuse light for softening harsh contrasts is to alter the developing process in a way which sacrifices color quality. Thus, the present invention has the advantage of enhancing color quality while simultaneously de-emphasizing scratches and providing a high intensity, uniform field at nearly arbitrary distances from the lamphouse. This result is achievable only by combining the operation of layer or surface 52 with scattering means 44. Either element in use by itself is unable to provide a diffused source of even illumination which is suitable for eradicating scratches with any projected image from film 20. It is to be noted that it is an important feature of the present invention, as contrasted with the prior art, that means 44 is both optically clear and is positioned at a substantial distance from film gate 22. In addition, the present invention permits the use of a plurality of lenses on the interior surface of means 44 rather than the frosted or ground glass diffusers well known to the prior art. This feature avoids the disadvantages of prior art diffusers wherein light intensity could be reduced by almost an order of magnitude by the ground glass plate and wherein the performance of such prior art plates were susceptible to substantial degradation by oil and dirt accumulations.

The position of the film frames of the master copy in film gate 22 is illustrated in plan view in FIG. 6. The cross section of housing 46 is shown as being square, but in practice may be any shape which circumscribes the usable portion 58 of the film frame.

Figure 8:
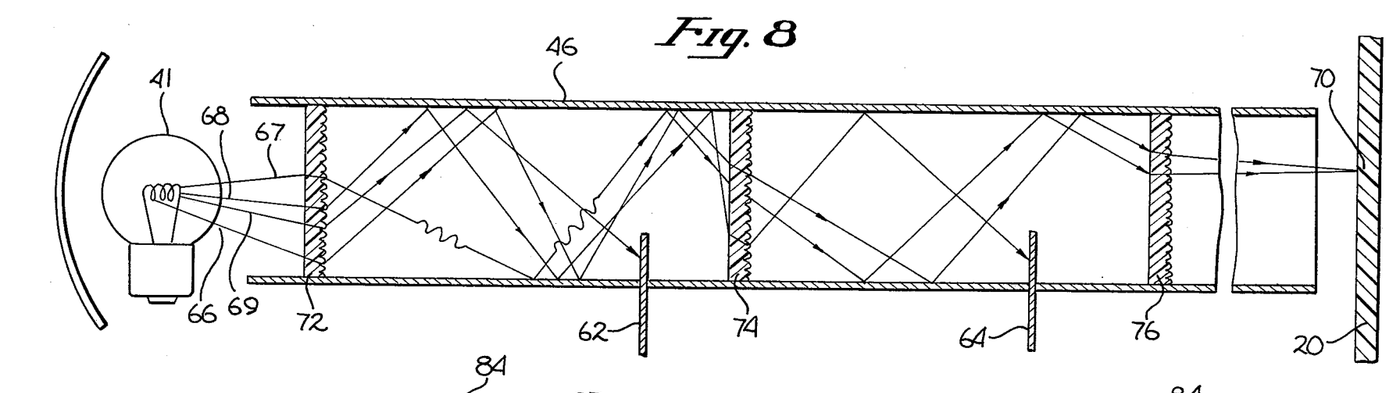
FIG. 8 is a cross sectional view of another embodiment of the present invention wherein a plurality of scattering means are combined with one or more shutters within the mixer.

Light composer 30 may be fabricated in stages to permit modulation of the light intensity from composer 30. For example, FIG. 8 illustrates a longitudinal cross section of a multi-stage device. A first scattering means 72 may be positioned near or at one end of mixer 46 adjacent to light source 41. Light source 41 may be used in combination with a reflector 60 or any other means for directing light to first scattering means 72. Two rays of light 66 and 68 originating at different points on the light source are diagrammatically traced in FIG. 8 as they propagate down the length of mixer 46 to the same point 70 on film 20. Light rays 67 and 69 are shown as propagating part way down mixer 46 before being absorbed or deflected by shutters 62 and 64. Light emitted by sourse 41 is scattered and randomly reflected by means of a first scattering means 76 and the optically roughened and reflective surface of mixer 46. It is entirely possible, however, that first scattering means 72 may be omitted in the multiple stage composer illustrated in FIG. 8. Shutters 62 and 64 are positioned between light source 41 and second scattering means 74 and 76, respectively. A sufficient length of mixer 46 extends beyond each shutter and scattering means to insure adequate diffusion of the unblocked light so that the shutter casts no shadow. The shutters are illustrated in FIG. 8 as simple vanes which may be translated along a direction perpendicular to the longitudinal axis of mixer 46. It is entirely possible, however, that shutters 62 and 64 may be of any type well known to the art including irises or compound vanes. It is a characteristic feature of the present invention that when a shutter is superimposed in front of one of the scattering means that the intensity of the illumination from composer 30 may be modulated according to the fraction of the scattering means which is blocked. In other words, no shadow or other image is transmitted from the output end of composer 30 due to the interposition of shutters 62 or 64 within mixer 46. The diffusion and scattering of light by scattering means 74 and 76 in combination with mixer 46 is of such a degree that a fractional light blockage of means 74 and 76 by shutters 62 or 64, respectively, decreases the overall intensity of the entire illumination field by approximately that fraction, rather than giving rise to a shadow or edge. For example, as a first approximation of 30% blockage of mixer 46 by shutters 62 and 64 will approximately result in a halving of the light intensity outputted by mixer 46 (0.70 × 0.70 = 0.49). Thus, shutters which are separated by a scattering means and a length of mixer 46 have a multiplicative effect.

Thus, it may be appreciated that the multiple stage composer of FIG. 8 may be used to create a calibrated fade and dissolve sequence on film copy 20. For example, maximum light intensity may be fixed by positioning shutter 62 at a calibrated position within mixer 46. Thus, shutter 62 may be manipulated to match the maximum exposure intensity of the A roll of a master copy with the B roll of the master copy to fade and dissolve one scene into another. The fading or dissolving may be accomplished by the controlled movement of shutter 64 while fim 20 is being exposed. Thus, shutter 62 will be set at a first position while the A roll is being projected onto film 20 and slowly faded out by translating shutter 64 into mixer 46. Film copy 20 is then reversed and reset. Shutter 62 is reset to a second position while the B roll is projected onto the same section of film 20 while shutter 64 is progressively withdrawn from mixer 46. Therefore, the scene from A roll will dissolve and fade as the scene from the B roll begins to emerge in a controlled fashion with the maximum intensities of both the A and B rolls being matched by means of shutter 62. It is entirely possible, however, that shutters 62 and 64 may be positioned in front of scattering means 74 and scattering means 72 and 76 omitted. In this manner, the output intensity of the field illumination will be independently controlled by two sequentially positioned shutters and a single scattering means 74 within mixer 46.

Figure 10:
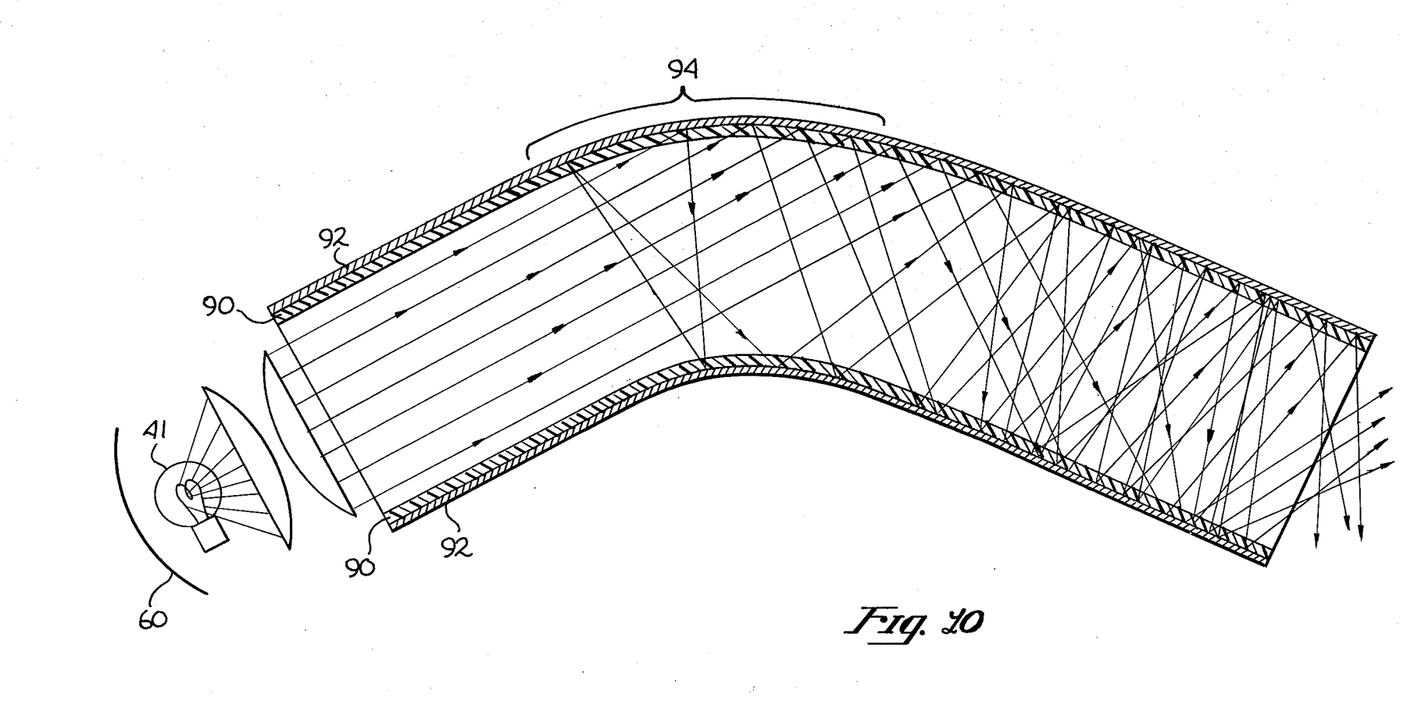
FIG. 10 is another embodiment of the present invention wherein the functional role of the scattering means is served by a portion of the surface of a curved light conduction element.

Another embodiment of the present invention is illustrated in FIG. 10. The light composer may be comprised of a light mixer or tube 90. Light mixer 90 may be a curved tube, rod, or pipe which has a treated surface 92. Surface 92 is illustrated as an exterior layer disposed on element 90, but includes a modification of the inner or outer surface of element 90 as well. Mixer 90 is curved so that light from source 41 may not be directly transmitted along the length of mixer 90, but must strike the surface of mixer 90 at least once. The surface of mixer 90 is reflective and optically rough so that reflections from the surface are not specular but tend to be diffuse. In this embodiment, the curve of mixer 90 serves the same functional role for scattering light within element 90 as scattering means 44 did with respect to mixer 46. That portion 94 of element 90 serving as a scattering means may have specially roughened and reflective surface or may have the same surface characteristics as the remaining portion of element 90.

Mixer 90 may be divided into two or more regions by an interior septum running the entire length of mixer 90, or by employing two or more separate light conduction elements, e.g., a fiber bundle, or an aggregate light mixer, between source 41 and the illuminated object. This division of mixer 90 may prove to be useful in providing multiple or independently controlled fields of illumination, or providing an additional means by which light from source 41 may be diffused, transmitted and made uniform.

The embodiment illustrated is shown only by way of example and is not essential to the efficient operation of the present invention. It is to be understood, however, that further modifications and alterations may be made by those with ordinary skill in the art as to the shape, size, and manner of combination of the various elements of the present invention without departing from its spirit and scope.

I claim:

1. A light composer for diffusing incident light comprising:
    a light mixer including a prismatic housing having a rectangular cross section and at least one reflective inner surface and two ends wherein said light mixer has means for scattering light and for directing said incident light to said surface of said light mixer including a layer of aluminium paint on said inner surface and a plate of optically clear material disposed over substantially all of one of said ends and having a surface formed into an array of semicircular lenses configured in a parallel fashion and having focal lengths substantially less than the length of said housing between said ends.

2. The composer of claim 1 wherein said aluminum paint has an optically rough and reflective finish to diffusely reflect light incident thereon.

3. The composer of claim 1 wherein said housing is curved so that substantially all of said incident light impinges on said aluminum paint.

4. In an apparatus for duplicating photosensitive material, a light composer to illuminate a master film copy with a thoroughly diffused light, said light composer comprising:
    a light mixer having an optically rough and reflective surface and having two opposed ends; and
    means for scattering a beam of light into a multiplicity of rays, said rays being directed toward said surface of said light mixer, said means being disposed over one of said ends to thereby provide said thoroughly diffused light at said opposed end of said light mixer;
    said means for scattering light including a plate of optically clear material having a surface disposed across one of said ends, said surface configured into a plurality of lenses, each of said lenses having a focal length substantially less than the length of said light mixer.

5. The light composer of claim 4 wherein said surface of said light mixer is coated with a layer of metallic paint.

6. The light composer of claim 4 wherein said surface of said light mixer is spray painted with an aluminum bearing paint.

7. The light composer of claim 4 wherein said surface of said light mixer is roughened by etching and is of an inherently reflective material.

8. In an apparatus for duplicating photographic material, a light composer comprising:
    a hollow prismatic housing having opposed open ends and a rectangular cross section, the length of said prismatic housing being substantially greater than any cross sectional dimension, said housing having an optically roughened and reflective interior first surface; and
    an optically clear plate disposed across one of said open ends, said plate having an interior second surface configured into a plurality of lenses, each of said lenses having a focal length substantially less than the length of said housing, said second surface inwardly disposed adjacent to one of said ends, said plurality of lenses arranged and configured to direct a multiplicity of light rays toward said interior first surface of said housing so that a thoroughly diffused light is transmitted to said opposed open end of said housing.

9. A light composer for producing uniform and diffuse field of illumination of light generated by a light source comprising:
    a light mixer having a surface which diffusely reflects light and having two ends;
    a plurality of means for scattering light into a multiplicity of rays, said rays being directed toward said surface of said light mixer, said means being disposed within said light mixer; and
    at least one shutter disposed within said light mixer to selectively shield at least one of said scattering means from light so that light transmitted to said end opposed to said light source has a substantially uniform field, is diffuse and may have an intensity modulated by said shutter.

10. The light composer of claim 9 further comprising:
    a plurality of shutters wherein at least one of said shutters is disposed between said light source and adjacent to a corresponding one of said scattering means.

11. The light composer of claim 10 wherein:
    said light mixer is a hollow housing having an inwardly directed, reflective and optically roughened surface;
    at least two scattering means are disposed within said housing; and
    at least two shutters are disposed adjacent to said corresponding dispersing means.

12. The composer of claim 10 wherein said light mixer is divided into at least two regions along the entire length of said mixer.

13. The composer of claim 10 wherein at least two of said mixers are associated to form a bundle.

14. A light composer for diffusing incident light, comprising:
    a hollow housing having opposed open ends and a length between said open ends greater than any cross sectional dimension of said hollow housing; and optically clear means at one of said open ends including a plate of optically clear material having a surface formed into an array of semicircular lenses for scattering said incident light inside said housing;

said hollow housing having an optically roughened and reflective interior surface for transmitting said scattered light along the length of said housing by a multiplicity of randomly oriented reflections to form a thoroughly diffused and uniform illumination across the other of said open ends of said housing.

15. The composer of claim 14, wherein said plate of optically clear material is disposed across said one of said open ends.

16. The composer of claim 14, wherein at least one of said lenses has a focal length less than said length of the hollow housing.

17. The composer of claim 14, wherein said lenses include an array of lenses configured in parallel fashion.

18. A light composer for diffusing incident light, comprising:

a light mixer having opposed ends and a length between said ends greater than any cross sectional dimension of said mixer; and optically clear means at one of said ends including a plate of optically clear material having a surface formed into an array of semicircular lenses for scattering said incident light inside said mixer;

said light mixer having an optically roughened and reflective interior surface for transmitting said scattered light along the length of said mixer by a multiplicity of randomly oriented reflections to form a thoroughly diffused and uniform illumination across the other of said ends of the mixer.

19. The composer of claim 18, wherein said plate of optically clear material is disposed across said one of said ends.

20. The composer of claim 18, wherein at least one of said lenses has a focal length less than said length of the mixer.

21. The composer of claim 18, wherein said lenses include an array of lenses configured in parallel fashion.

22. A light composer for diffusing incident light, comprising:

a hollow housing having opposed open ends and a length between said open ends greater than any cross sectional dimension of said hollow housing;

optically clear means located in said housing for scattering said incident light inside said housing; and adjustable shutter means extending in said housing between one of said open ends and said scattering means for modulating the intensity of the light output of said composer;

said hollow housing having an optically roughened and reflective interior surface for transmitting said scattered light along the length of said housing by a multiplicity of randomly oriented reflections to form a thoroughly diffused and uniform illumination across the other of said open ends of said housing.

23. The composer of claim 22, including a further optically clear means located in the vicinity of said one of said open ends for scattering said incident light inside said housing, with said shutter means being located between the latter further optically clear means and the first-mentioned optically clear means.

24. The composer of claim 22, wherein said light scattering means comprises a plate of optically clear material disposed across said one of said open ends and having a surface formed into at least one refracting lens.

25. The composer of claim 22, wherein said light scattering means comprises a plate of optically clear material disposed across said one of said open ends and having a surface formed into at least one refracting lens having a focal length less than said length of the hollow housing.

26. The composer of claim 22, wherein said light scattering means comprises a plate of optically clear material having a surface formed into an array of semicircular lenses.

27. The composer of claim 22, wherein said light scattering means comprises a plate of optically clear material having a surface formed into an array of semicircular prismatic lenses configured in parallel fashion.

* * * * *